Patented Aug. 19, 1941

2,253,179

UNITED STATES PATENT OFFICE

2,253,179

SUBSTITUTED HYDROAROMATIC AMIDES

Winfrid Hentrich, Dusseldorf-Reisholz, Germany, Carl Albert Lainau, deceased, late of Dusseldorf, Germany, by Adolf Bartholomaus, administrator, Dusseldorf, Germany, and Wilhelm Jakob Kaiser, Dessau, Germany, assignors, by mesne assignments, to The Procter & Gamble Company, Cincinnati, Ohio, a corporation of Ohio No Drawing. Application October 2, 1937, Serial No. 167,014. In Germany October 3, 1936

16 Claims. (Cl. 260—507)

This invention relates to nuclear substituted hydroaromatic amides and to processes of producing the same.

An object of the present invention is to provide a new series of compounds which have properties of diverse nature rendering them suitable for use in several branches of industry. A more limited object is to provide a new series of capillary active compounds which are excellently adapted as wetting, cleaning, foaming, emulsifying and penetrating agents.

The compounds of the present invention may be referred to broadly as hydroaromatic amides having at least one side chain of at least 4 carbon atoms attached to the hydroaromatic nucleus. In accordance with the process of the invention, these compounds are produced by reacting hydroaromatic primary or secondary amines containing a side chain of at least 4 carbon atoms with acid compounds, including both acids themselves and as well derivatives thereof, which are capable of forming amides from amines, in general.

For the production of the amides of the present invention, a new class of hydroaromatic amines containing at least one side chain having at least 4 carbon atoms is now available due to the extensive work of two of the present applicants. These amines are described in the copending United States application, Serial Number 155,002, filed on July 22, 1937. In this prior application the amines are described as being prepared by reacting nitrogen compounds with hydroaromatic compounds substituted by at least one hydrocarbon radical containing at least 4 carbon atoms and also substituted by at least one group which may be replaced by a basic group.

In accordance with the process of the present invention amines are made use of which possess the general formula R(HY AR)NHR'. In this general formula R denotes a hydrocarbon group which is preferably of an aliphatic structure including both open chain aliphatic radicals and also cycloaliphatic radicals. In either case the hydrocarbon group contains at least 4 carbon atoms, such groups being for example, butyl, hexyl, heptyl, octyl, diisobutyl, nonyl, decyl, undecyl, dodecyl, triisobutyl, tetradecyl, hexadecyl, and octadecyl groups. Depending upon the particular properties desired, the group R may be a normal hydrocarbon chain or may be a branched chain. Furthermore, it may be of a primary, secondary or a tertiary nature and may also have its carbon atom chain interrupted by oxygen, sulphur or nitrogen atoms. Satisfactory examples of cycloaliphatic R groups include cyclohexyl radicals substituted with alkyl groups of any number of carbon atoms and related substitution products of the hexahydrobenzyl radical and the decahydromenaphthyl radical. It is not necessary that single amines be used for various mixtures of the same are also within the scope of the present invention.

In the above mentioned general formula the group HY AR refers to a hydroaromatic (cycloaliphatic) radical which for example may be that of cyclohexane, decahydronaphthalene, dodecahydrodiphenyl and their substitution products, and as well other compounds of similar structure. The symbol R' of the formula denotes hydrogen or any organic radical which may be desired for imparting special properties to the amides produced therefrom.

In forming the amides of the present invention, the hydroaromatic primary or secondary amines containing at least one side chain having at least 4 carbon atoms are reacted with acids or their derivatives, examples being for instance, acid anhydrides, acid halogenides, esters and other like compounds. In accordance with a simple embodiment of the invention the herein described amines are reacted with compounds of the nature of aliphatic carboxylic and sulphonic acids, such as acetic acid, methoxyacetic acid, alkylmercaptoacetic acid, pyromucic acid, propionic acid, fatty acids such as oleic acids, stearic acid, and also behenic acid, montanic acid, abietic acid and aromatic acids such as benzoic acid and its substitution products. Other examples include isocyanic acid esters, ethanesulphonic acid, benzylsulphonic acid, and aromatic sulphonic acids of the nature of benzenesulphonic, chlorcarbonic acid esters, phosgene, carbondisulfide and the like, and in the use of such compounds one can profitably employ the above noted acid derivatives.

In accordance with one specific embodiment of the process of the present invention, particularly valuable amides are obtained by the reaction of the hereinbefore mentioned amines with acids which contain at least one hydrophile group which remains unchanged in the amide obtained. As examples of suitable hydrophile groups there may be mentioned acid radicals, hydroxyl radicals, ether radicals, mercapto radicals, amino radicals, and ester radicals.

In order to obtain the amides which possess one or more hydrophile groups, the present invention contemplates processes involving reaction of the herein before described amines such for example as 4-secondary-decyl-2-methyl-cyclohexylamine with polyvalent acids such as, for example, oxalic acid, malonic acid, succinic acid, adipic acid, sebacic acid, phthallic acid, sulfoacetic acid, sulfophthallic acid thiodiglycolic acid, sulphobenzoic acid, and chlorsulphonic acid. The acid amides obtained still may possess at least one free acid group. Valuable compounds within the scope of the present invention are also obtained by the reaction of the amines of the nature hereinbefore described, for example, a mixture consisting of 4-secondary-hexyl, secondary-octyl, secondary-decyl, and secondary - dodecyl-2-methyl - cyclohexylamines with such acids as glycolic acid, lactic acid, oxyethyloxyacetic acid lactone, thioglycolic acid, salicyclic acid, anthranylic acid, preferably in the form of the isatoic acid-anhydride., acetyl-p-sulfanilic acid-chloride, dimethyl-aniline-m-sulphochloride.

Additional compounds within the scope of the present invention may be obtained by introducing other hydrophile groups into the acid amides obtained in the above manner, for example, by means of sulfonation, reaction with alkylene oxides such as with one or more moles of ethylene oxide, propylene oxide, glycide, epichlorhydrin, cyclohexeneoxide; or by the reaction with halogen carboxylic acids, such as chloracetic acid, or by halogen sulphonic acids such as bromethanesulfonic acid. Amides containing amino groups may be converted into strongly hydrophile quaternary ammonium compounds by treating the same with alkylating or aralkylating agents.

In accordance with yet another embodiment of the present invention wherein a new series of valuable amides are produced, the hereinbefore mentioned hydroaromatic amines are reacted with acids or acid derivatives which contain at least one readily reactive atom or atom group suitable for introduction of hydrophile groups as an additional step. The amides containing the readily reactive group may be obtained for example, by reacting the amine or amines of the structure hereinbefore described, such as a mixture of homologues of 4-alkyl-cyclohexylamines, with halogen carboxylic acids or with halogen sulphonic acids or other derivatives such as chloracetylchloride, alpha-chlorphenyl-acetyl-chloride, chlorpropionic acid, 2-brom-lauric acid bromide, beta-chlor-ethanesulfonic acid-chloride, nitrobenzol-3-sulfochloride and its nuclear substitution products as for example 4-chlor-3-nitrobenzenesulfochloride, benzylchloride-p-sulfochloride. Hydrophile groups may also be introduced into the amides containing one or more double bonds in the acyl radical, such amides being obtainable for example, through the use of acids of the nature of acrylic acid, crotonic acid, cinnamic acid, phenoxyacetic acid and cresoxyacetic acid.

Hydrophile groups may be introduced into the amides containing the readily reactive groups in accordance with any one of a number of known processes. In accordance with one method, acid amides are used which contain a halogen atom which is readily replaceable, with compounds of the nature of sulphites, thiosulfates, alkali compounds of alcohols, particularly polyhydroxy alcohols and ether alcohols, or with mercaptides or nitrogen containing compounds such as primary, secondary and tertiary amines, or hydroxy-alkyl amines. Amines of this type may comprise, for example, trimethylamine, triethanolamine, dimethylbenzylamine, diethylallylamine, methyl-glycamine, glycocoll, sarcosine, alanine, taurine, methyltaurine, sulfanilic acid, asparaginic acid and other like compounds.

In accordance with another method, hydrophile groups are introduced into amides which contain double bonded carbon atoms as the readily reactive group, by means of for example, sulfonation, sulfiting, or by the addition of cercaptocarboxylic and sulfonic acids.

Still other methods may be employed for the introduction of hydrophile radicals. For example, such may be accomplished by reacting 4-secondary-dodecyl-2-methylcyclohexyl amine with 3-nitrobenzenesulfochloride. In the amide obtained in this manner, the nitro group may be reduced, for example with sodium sulphide to form an amino group which may then be made use of for the insertion of additional radicals which impart water solubility, for example, by reaction with ethylene oxide.

The above described whole process may be illustrated by the procedure involving heating phenoxyacetic acid with 4-secondary-dodecyl-2-methyl-cyclohexylamine, after which the water formed is distilled off, the final product obtained being phenoxyacetic acid, 4-secondary-dodecyl-2-methylcyclohexyl amide. In accordance with a further step the amide obtained in this manner is converted into sulphophenoxy acetic acid-4-secondary-dodecyl-2-methylcyclohexyl amide, by treating the same with concentrated sulphuric acid. When neutralized to form water soluble salts, the product obtained has capillary active properties in aqueous solution.

By reaction of a mixture of 4-secondary-hexyl-, secondary-octyl, secondary-decyl and secondary-dodecyl-2-methyl-cyclohexylamine with chloracetylchloride in the presence of dimethylaniline, there is obtained a mixture of the chloracetic acid amides of the named secondary-alkyl, methyl-cyclohexylamines. The mixture of chloracetic acid amides obtained in this manner is next reacted with sodium sulfite. Upon purification of the resulting mass there are obtained the sodium salts of sulfoacetic acid-4-secondary-alkyl-2-methyl-cyclohexylamide, aqueous solutions of which possess good capillary active properties.

In the following, wherein all parts are given by weight, illustrations of the products and processes of the present invention are set out.

*Example 1.*—120 parts of a technical grade of 4-secondary-octyl-cyclo-hexyl amine (boiling point at 2 mm. of 110° to 130° C.) are heated to a temperature of 200° C. with 38 parts of phenoxy acetic acid while nitrogen is passed therethrough, until reaction goes substantially to completion. The product obtained after purification comprises phenoxyacetic acid-4-secondary-octyl-cyclohexyl-amide, and has the appearance of a viscous oil. In order to obtain water soluble derivatives of the amide, the same is treated with concentrated sulphuric acid, after which the resulting sulphonation product is neutralized with sodium hydroxide to form a water soluble salt thereof. The final product is a colorless powder which dissolves and forms a clear solution in water. It possesses excellent washing and cleaning properties and as well, good penetrating and lime dispersing properties.

*Example 2.*—90 parts of a technical mixture of 4-secondary-octyl-cyclohexyl methyl amine are heated to a temperature of 200° C. for some time with 90 parts of cresoxy acetic acid, during the introduction of nitrogen. The amide obtained in this manner comprises a clear highly viscous oily mass. Water soluble derivatives of this amide may be obtained by treating the same with concentrated sulphuric acid and heating to a temperature of 50° C. and finally neutralizing with sodium hydroxide, the product obtained being the sodium salt of sulfocresoxyacetic acid 4-secondary-octyl-cyclo-hexyl-methylamide. This compound is a colorless powder, aqueous solutions of which possess excellent foaming, wetting and lime dispersing qualities.

*Example 3.*—82 parts of a technical grade of 4-secondary-octylcyclohexylamine are thoroughly mixed together with 44 parts of dimethyl aniline, and 100 parts of petroleum ether. Thereupon the resulting mixture is treated with 38 parts of chloracetylchloride during continual stirring and cooling. After stirring for considerable time, the chlorhydrate of the dimethylaniline formed is separated from the petroleum ether solution from which is obtained chloracetic acid, 4-secondary-octyl-cyclohexyl amide as a highly viscous oil.

40 parts of the amide obtained in this manner are heated over a considerable period in a reflux condenser with 40 parts of crystalline sodium sulphite and 500 parts of 60% alcohol. Through purification there is obtained the sodium salt of sulfoacetic acid-4-secondary-octyl-cyclohexylamide as a colorless powder, aqueous solutions of which possess excellent washing powers.

The sodium salt of the sulfoacetic acid, 4-secondary-octyl-cyclohexyl-methylamide may be produced in a similar manner.

*Example 4.*—82 parts of a technical grade of 4-secondary-octyl-cyclohexyl-methylamine are heated to a temperature of 200° C. for a considerable period, while in admixture with 43 parts of succinic acid during which treatment nitrogen is passed through the reaction mass. The molten product obtained is then poured into water and is heated for some time while in admixture with 45 parts of a 30% solution of sodium hydroxide which in the meantime has been added thereto. Through purification a product is obtained which comprises the sodium salt of the succinic acid, 4-secondary-octyl-cyclohexyl-methylsemiamide as a colorless powder which is soluble in water and which possesses good wetting properties.

The sodium salt of phthallic acid, 4-secondary-octyl-cyclohexyl-methyl-semiamide having similar properties to the above described amide, may be obtained by treating 4-secondary-octyl-cyclohexyl-methylamine with phthallic acid anhydride followed by neutralization.

The new compounds produced in accordance with the processes of the present invention and described herein are suitable for use in a number of industries. The water insoluble compounds are particularly adapted as softening agents for use in the rubber industry. The water insoluble compounds generally possess wax-like properties and therefore are used as wax substitutes in many fields. The water soluble compounds of the present invention in general possess excellent capillary active properties and therefore are used as penetrating, washing, cleansing, emulsifying and dispersing agents. They also can be made use of as desirable disinfectant agents.

*Example 5.*—85 parts of 4-secondary-octyl-2-methyl-cyclohexyl-methyl-amine are thoroughly mixed together with 44 parts of dimethyl-aniline and 100 parts of petroleum ether. Thereupon the resulting mixture is treated with 38 parts of chloracetyl chloride during continual stirring and cooling. After stirring for considerable time the chlorhydrate of the dimethylaniline formed is separated from the petroleum ether solution from which is obtained the chloracetic acid -4- secondary - octyl -2- methyl - cyclohexyl-methylamide as a highly viscous oil.

159 parts of the amide obtained in this manner are heated to a temperature of 80 to 100° with 90 parts of piperidine and 200 parts of decahydronaphthaline during continual stirring. The piperidine-chlorhydrate formed is filtered off. From the filtrate there is obtained through vacuum distillation the piperidyl-acetic acid, 4-secondary - octyl-2-methyl - cyclohexyl - methylamide as a colorless viscous oil with the boiling point at 2 mm. of 205–215°. The amide obtained may be converted into the corresponding quaternary ammonium compound by heating to a temperature of 50° 91 parts of the amide with 32 parts of benzylchloride. The aqueous solutions of the quaternary ammonium compound possess excellent foaming, wetting and disinfecting qualities. By an aqueous solution containing 1 part of the quaternary ammonium compound for 20,000 parts of water *Bact. colic* are killed at room temperature after a period of 15 minutes.

It should be understood that the present invention is not limited to the specific examples hereinbefore given, but that it extends to all equivalent materials and procedures within the terms of the claims appended hereto. In these claims the expression "hydroaromatic amine having at least one hydrogen atom attached to the nitrogen atom" refers generically to the primary and secondary hydroaromatic amines hereinbefore described.

We claim:

1. The process which comprises reacting a cycloaliphatic amine having at least one hydrogen atom attached to the nitrogen atom and containing at least one side chain of at least 6 carbon atoms attached to the cycloaliphatic nucleus with an acid compound adapted to form an amide selected from the group consisting of carboxylic acid amides and sulfonic acid amides, whereby an amide of the substituted cycloaliphatic compound is obtained.

2. As new compounds, cycloaliphatic amides having at least one side chain of at least 6 carbon atoms attached to the cycloaliphatic nucleus, the acyl radical of said amide being selected from the group consisting of carboxylic acid radicals and sulfonic acid radicals.

3. The process which comprises reacting a cycloaliphatic amine having at least one hydrogen atom attached to the nitrogen atom and containing at least one side chain of at least 6 carbon atoms attached to the cycloaliphatic nucleus with an acid selected from the group consisting of carboxylic acids and sulfonic acids adapted to form amides from amines, said acid having at least one hydrophile group in addition to the acid group which forms the amide linkage, whereby an amide of the substituted cycloaliphatic compound containing more than one hydrophile group is obtained.

4. As new compounds, cycloaliphatic amides having at least one side chain of at least 6 carbon atoms attached to the cycloaliphatic nucleus, the acyl radical of the amide selected from the group consisting of carboxylic acid and sulfonic acid radicals and containing at least one hydrophile group therein.

5. The process which comprises reacting a cycloaliphatic amine having at least one hydrogen atom attached to the nitrogen atom and containing at least one side chain of at least 6 carbon atoms attached to the cycloaliphatic nucleus with an acid selected from the group consisting of carboxylic acids and sulfonic acids adapted to form amides from amines, said acid having at least one readily reactive group suitable for the introduction of hydrophile groups and introducing hydrophile groups into said acid radical at the position of such reactive groups.

6. The process which comprises reacting an alkylated cyclohexyl amine having at least 4 carbon atoms in the alkyl radical, with an aryloxy-aliphatic acid whereby an amide is produced, sulfonating said amide, and neutralizing to form a water soluble salt thereof.

7. As a new compound, octylcyclohexyl amide of a sulfonated phenoxy-aliphatic acid.

8. As a new compound a water soluble salt of octylcyclohexyl sulfophenoxyacetamide.

9. The process which comprises reacting an alkylated cyclohexyl amine having at least 4 carbon atoms in the alkyl radical with a dibasic organic acid whereby a mono-amide is produced and neutralizing to form a water soluble salt thereof, the acyl radical of said amide being selected from the group of carboxylic acid radicals and sulfonic acid radicals.

10. As a new compound, an alkylated cyclohexylmono amide of a dibasic organic acid, said alkyl radical having at least 4 carbon atoms, the acyl radical of said amide being selected from the group of carboxylic acid radicals and sulfonic acid radicals.

11. As a new compound, a water soluble salt of an alkylated cyclohexylmono amide of a dibasic organic acid, said alkyl radical having at least 4 carbon atoms, the acyl radical of said amide being selected from the group of carboxylic acid radicals and sulfonic acid radicals.

12. Capillary active compounds consisting of a water soluble cycloaliphatic amide having at least one side chain of at least 6 carbon atoms attached to the cycloaliphatic nucleus and at least one hydrophile group attached to the acyl radical of the amide, said acyl radical being selected from the group consisting of carboxylic acid radicals and sulfonic acid radicals.

13. Wetting, cleaning, foaming, emulsifying and dispersing agents composed of water soluble salts, of alkylated cycloaliphatic amides of aliphatic dibasic acids, there being at least one alkyl radical containing at least 6 carbon atoms attached to the cycloaliphatic nucleus, said dibasic acid being selected from the group consisting of carboxylic acids and sulfonic acids.

14. Wetting, cleaning, foaming, emulsifying and penetrating agents comprising water soluble salts of sulfonated amides, said amides being cycloaliphatic amides substituted in the cycloaliphatic nucleus by at least one aliphatic radical of at least 6 carbon atoms, the acyl radicals of the amides constituting the connecting links to the sulfuric acid radicals of the said sulfonated amides and being selected from the group consisting of carboxylic acid radicals and sulfonic acid radicals.

15. The process which comprises reacting an octylcyclohexylamine having at least one hydrogen atom attached to the nitrogen atom with a phenoxy aliphatic acid, sulfonating the resulting product, and neutralizing the sulfonation product obtained with an alkali metal salt to form a water-soluble salt thereof.

16. The process which comprises reacting a hydroaromatic amine having at least one hydrogen atom attached to the nitrogen atom and containing a side chain of 8 carbon atoms attached to the hydroaromatic nucleus with an acid compound adapted to form an amide selected from the group consisting of carboxylic acid amines and sulfonic acid amides whereby an amide of the substituted hydroaromatic compound is obtained.

WINFRID HENTRICH.
WILHELM JAKOB KAISER.
ADOLF BARTHOLOMAUS.
*Administrator of the Estate of Karl Albert Lainau, Deceased.*